United States Patent [19]

Bocelli et al.

[11] Patent Number: 4,540,426
[45] Date of Patent: Sep. 10, 1985

[54] APPARATUS FOR BENDING AND TEMPERING THERMOPLASTIC SHEET MATERIAL

[75] Inventors: Aureliano Bocelli, Leghorn; Carlo Colombini, San Prospero, both of Italy

[73] Assignee: Saint Gobain Vitrage, Courbevoie, France

[21] Appl. No.: 632,782

[22] Filed: Jul. 20, 1984

[30] Foreign Application Priority Data

Jul. 20, 1983 [FR] France .................. 83 11955

[51] Int. Cl.$^3$ .................. C03B 23/033; C03B 27/04
[52] U.S. Cl. .................. 65/273; 65/104; 65/114; 65/287
[58] Field of Search .................. 65/104, 114, 118, 119, 65/349, 350, 351, 273, 287, 106

[56] References Cited

U.S. PATENT DOCUMENTS

| | | | |
|---|---|---|---|
| 3,782,916 | 1/1974 | Powell et al. | 65/273 X |
| 3,799,752 | 3/1974 | Cheron | 65/351 |
| 3,801,298 | 4/1974 | Bezombes | 65/104 |
| 3,831,239 | 8/1974 | Hoff et al. | 65/106 X |
| 4,054,437 | 10/1977 | Ueberwolf et al. | 65/107 |
| 4,054,438 | 10/1977 | Presta | 65/107 |
| 4,123,246 | 10/1978 | Johnson | 65/104 |
| 4,139,359 | 2/1979 | Johnson et al. | 65/107 |
| 4,203,754 | 5/1980 | Potier | 65/273 |
| 4,292,065 | 9/1981 | Nedelec et al. | 65/104 |

FOREIGN PATENT DOCUMENTS

| | | |
|---|---|---|
| 1476785 | 3/1967 | France . |
| 2129919 | 11/1972 | France . |
| 2144523 | 2/1973 | France . |
| 2189330 | 1/1974 | France . |
| 2383890 | 10/1978 | France . |
| 2442219 | 6/1980 | France . |
| 2492361 | 4/1982 | France . |

Primary Examiner—Arthur Kellogg
Attorney, Agent, or Firm—Pennie & Edmonds

[57] ABSTRACT

An apparatus for bending or bending and tempering of thermoplastic sheets such as glass sheets heated to their softening temperature by passing the glass sheets over a bed of straight or curved supporting rollers placed along a profile with an upward concavity. The apparatus comprises a pivoting assembly which transfers the glass sheets from a supporting bed of rollers with one slope to a conveyor with a different slope. The last supporting roller of the bed of supporting rollers constitutes the first support roller of the conveyor. The apparatus permits the transfer of glass sheets from a transport system with one slope to another transport system with a different slope without damaging either the glass sheets themselves or any coatings that may have been applied to the glass sheets.

15 Claims, 2 Drawing Figures

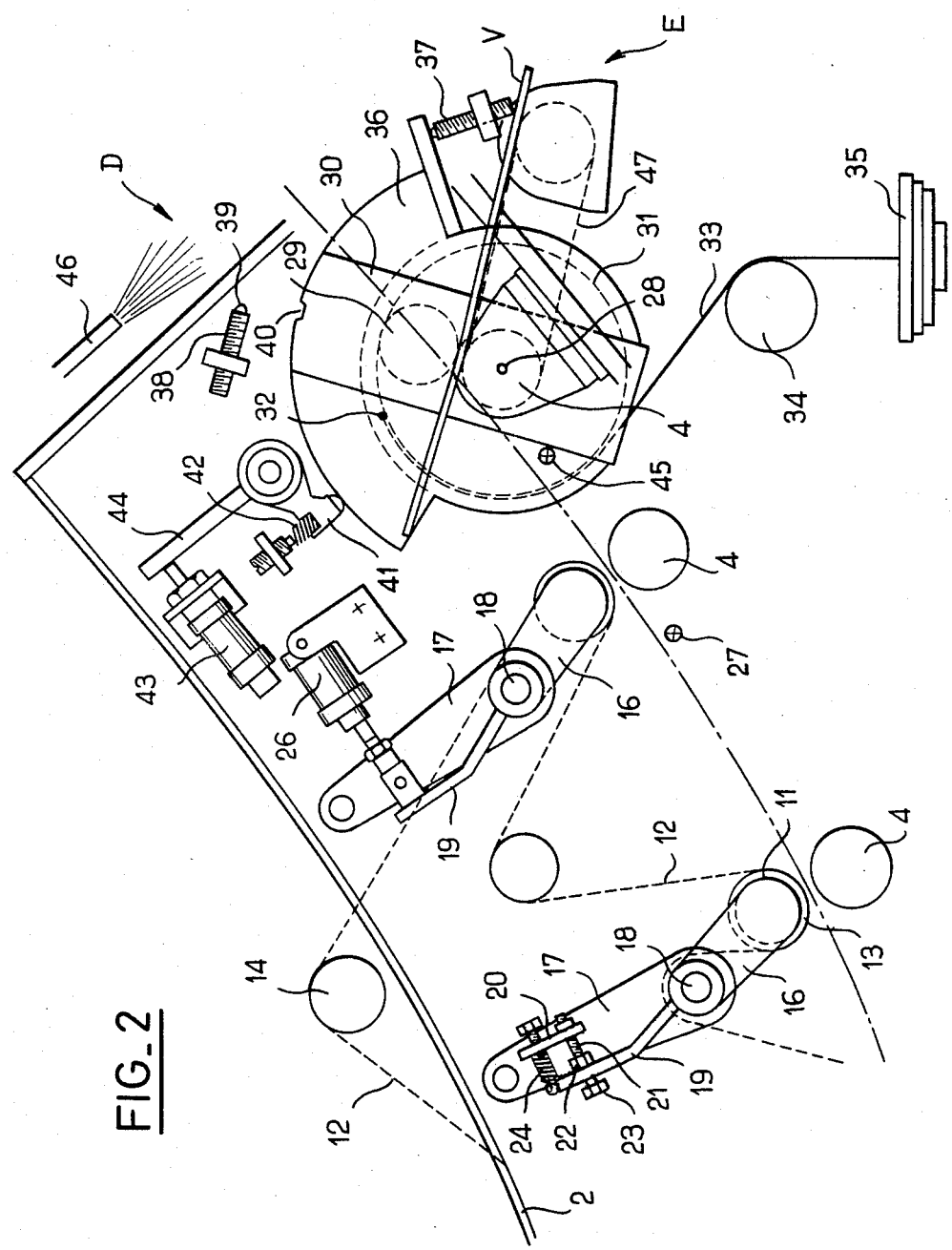
FIG_2

APPARATUS FOR BENDING AND TEMPERING THERMOPLASTIC SHEET MATERIAL

TECHNICAL FIELD

The present invention relates to the bending or the bending and tempering of sheets in the plastic state, such as glass sheets heated to their softening temperature. Sheets pass over a bed of rollers and are given a curved profile with an upward concavity. While the invention is described with respect to the bending and tempering of glass sheets, it will be understood that the invention may be applied to other materials as well.

BACKGROUND OF THE INVENTION

French Pat. No. 2,442,219 describes a method and apparatus for bending or bending and tempering glass sheets by passing the sheets over a bed of curved rollers or rods placed along a curved profile. Such apparatus heats the glass sheets to their softening temperature and passes the sheets over a bed of curved rollers so that as the glass sheets advance over the rollers they acquire a curvature in their direction of movement conforming to the shape of the bed of curved rollers. In addition, the sheets will also acquire the same transverse curvature as that of the rollers or rods over which the advance.

To ensure that the glass sheets pass uniformly over the bed of rollers without abrupt changes in direction, which could adversely affect the quality of the glass, especially at the input to the bending apparatus, the bending apparatus is aligned with the upstream conveyor of the glass sheets so that the sheets undergo only a gradual variation of slope. In apparatus in which glass sheets are given an upwardly concave profile, however, this gradual change in slope results in a very substantial tilt in the end portion of the glass sheet shaping bed. Since the glass sheets will tend to slide at the end portion, it is difficult to handle the sheets properly so that the quality of the sheets is not impaired and the sheets are not damaged.

Additionally, because the point where the glass sheets exit the bending apparatus is typically at a different level from that where the glass sheets enter the bending apparatus, installation difficulties result.

An apparatus which bends sheets of glass so that the sheets become concave upwardly has the advantage of being able to apply glass coatings to the surface of the sheets which is not in contact with the support rollers. These coatings may be fragile as, for example, layers or strips of enamel that have not yet solidified after vitrification occurring during heating of the glass sheets in preparation for bending and tempering. If the glass sheets to be introduced into the glass bending and tempering apparatus are to be used for windshields, back windows, or side windows of motor vehicles, such strips of enamel are typically placed on the periphery of the glass sheet to mask the glue used to attach the glass sheets and to obtain a clean, uniform appearance.

DISCLOSURE OF THE INVENTION

The present invention is directed to improving glass sheet bending and tempering machines that produce sheets of glass with a curved profile with an upward concavity to facilitate handling and recovery of the treated sheets and to prevent the treated sheets from sliding in order to preserve and protect the upper surface and any coatings that have been applied thereto.

Glass sheet bending and tempering machines which have been improved by using the apparatus disclosed in this invention are easier to install because the level at which the glass sheets exit the bending and tempering machine is approximately equal to the level at which the glass sheets enter the machine, and, in addition, the input and output conveyors are nearly horizontal.

Preferably, the apparatus of the invention comprises a series of elements forming a bed for supporting the glass sheets such as rollers or rods which may be curved in the transverse direction and which have a curved profile with an upward concavity in the direction of movement of the sheets. In accordance with the invention, the final supporting element in such bed is associated with a final upper holding means which is able to pivot around the final supporting element. The final supporting element acts as the first supporting element of a conveyor which receives the sheets of glass after they have undergone bending and tempering. This conveyor is positioned so that its slope is different from that of the curved profile of the portion of the bending and tempering supporting bed immediately preceding it.

The final upper holding means is mounted on a pivoting frame which enables the upper holding means to pivot around the final supporting element with an axis of rotation coinciding with that of the final supporting element. The pivoting frame is equipped with a restoring means such as a counterweight which tends to return the frame to its initial position so that the final supporting element and final upper holding means are aligned with the curved profile of the glass sheet support bed.

The value of the restoring force applied to the pivoting frame by the counterweight is dependent upon the characteristics and size of the glass sheets that are worked and is chosen so that the frame pivots under the weight of the concave glass sheet when the sheet is completely supported by only the final supporting element and final upper holding means. Advantageously, a gas jet is directed onto the concave upper surface of the glass sheet to aid in the pivoting action.

BRIEF DESCRIPTION OF THE DRAWING

These and other objects, features and elements of the invention will be more readily apparent from the following detailed description of the invention in which:

FIG. 2 is a detailed side view of the glass sheet pivoting system of our invention.

BEST MODE FOR CARRYING OUT THE INVENTION

Figure 1:
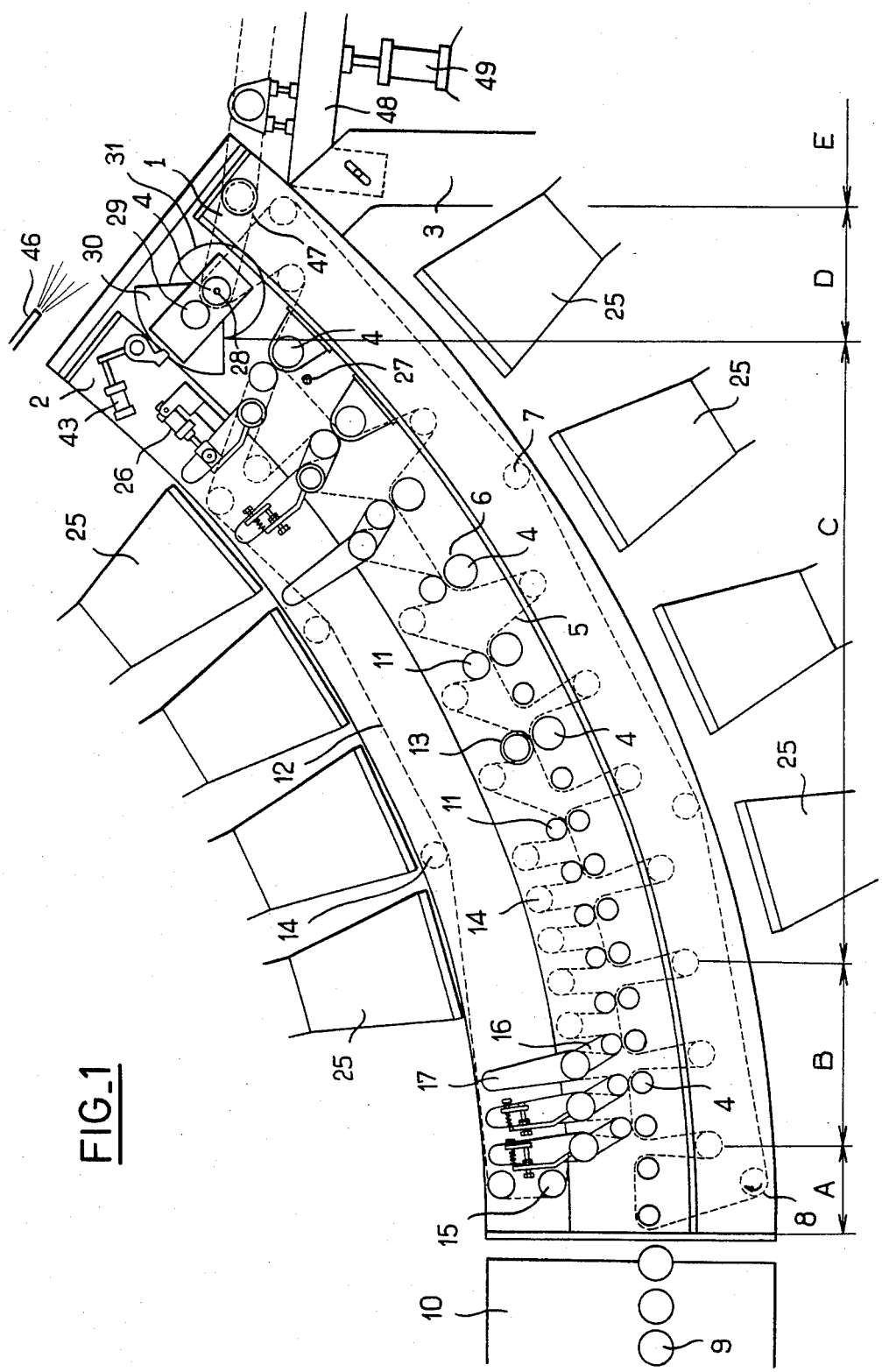
FIG. 1 is a side view of an illustrated embodiment of a sheet bending and tempering apparatus of our invention.

FIG. 1 depicts an illustrated embodiment of an apparatus for bending and tempering glass sheets according to the invention in which the various elements for supporting the glass sheets are placed along a uniformly curved profile having an upward concavity in the direction of movement of the glass sheets.

The apparatus comprises lower frame 1 and upper frame 2, both with the same curvature, and a support frame 3. Lower frame 1 supports and carries glass sheets by means of support rollers 4 which are placed parallel to one another with the axes of rotation in the direction of the width of lower frame 1. Support rollers 4 are rotated by a chain drive 5 which drives pinions 6 placed at one end of support rollers 4. Chain drive 5 is held taut by lower tension and recall pinions 7 and is driven by lower drive shaft 8. Support rollers 4 form a bed with a curved profile in the direction of movement of the glass sheets for shaping the heated glass sheets which are delivered to support rollers 4 by conveyor 9 within furnace 10.

Upper frame 2 rests on the upper face of the glass sheets and holds the glass sheets against support rollers 4 by means of holding rollers 11. Holding rollers 11 are aligned on the same curve as support rollers 4 and are optionally provided with rings which make contact with the glass sheets. Each holding roller 11 is associated with a single support roller 4 and is typically placed so that the axes of rotation of each holding roller 11 and its associated support roller 4 fall on a plane which is approximately perpendicular to the point on the glass sheet where each support roller 4 and its associated holding roller 11 make contact with the glass sheet.

Advantageously, to aid in the movement of the glass sheets between support rollers 4 and holding rollers 11 at points where the glass sheets are tilted upward at a great slope, holding rollers 11 are rotated by upper chain drive 12 which drives pinions 13 placed at an end of holding rollers 11 so that holding rollers 11 rotate at the same speed as support rollers 4. Upper chain drive 12 is held taut by upper tension and recall pinions 14 and is driven by upper drive shaft 15.

To allow the passage of the glass sheets, holding rollers 11 and support rollers 4 are separated by an appropriate distance. Advantageously, to allow the use of the apparatus for various glass thicknesses, the distance separating holding rollers 11 and support rollers 4 is adjustable by means of a double set of two connecting rods 16 and 17, one set of each at each end of holding rollers 11. As best shown in FIG. 2, one end of each of lower connecting rod 16 supports a holding roller 11. The other end of each lower connecting rod 16 is hinged on shaft 18, which is connected to upper connecting rod 17 and fastened to upper frame 2. Each lower connecting rod 16 has an arm 19. The position in relation to stop 20 of upper connecting rod 17 is adjustable by a system of screws 21 and nuts 22 and 23 which lock arm 19 between them thereby determining the separation and orientation of holding roller 11 relative to support roller 4.

In order to allow some elasticity to enter the system, a restoring force is applied to each arm 19 by spring 24 and some clearance is left between nuts 22 and 23 to permit arm 19 to move back and forth slightly. In order to avoid any changes in the tension of upper drive chain 12, shaft 18 preferably acts as the axis of rotation of an upper tension and recall pinion 14 on which upper drive chain 12 meshes.

The entrance of bending and tempering apparatus, generally designated as zone A, comprises support rollers 4 but does not necessarily include upper holding rollers 11. Zone A immediately follows conveyor 9 on which the glass sheets pass through heating furnace 10.

It is advantageous to use upper holding rollers 11 in association with support rollers 4 in zone A in order to help the lead and trailing edges of the glass sheets to enter the bending and tempering apparatus easily and in order that the glass sheets begin to adopt the desired curved profile as early in the bending process as possible.

Preferably, the perpendicular alignment of holding rollers 11 in relation to the support rollers 4 with which they are associated in zone A can be modified so that holding rollers 11 may be moved either upstream or downstream. This change in the alignment of holding rollers 11 allows the leading or trailing edge of the glass sheets to acquire the correct curved profile within zone A. The alignment may, for example, be changed by replacing screw 21 of the adjustment system of holding rollers 11 described above with a jack which operates a certain adjustable time period after a sensor is activated by either a leading or trailing edge of a glass sheet. This alignment changing system is particularly applicable for the holding roller 11 associated with the first support element 4 in zone A; however, such a system may be employed in connection with all holding rollers 11.

In zone B, holding rollers 11 and support rollers 4 are present.

In zone C, in addition to holding rollers 11 and support rollers 4, blowing nozzles 25 are present to blow a cooling gas, generally air, onto the glass to temper it. Blowing nozzles 25 are placed so as to blow cooling gas onto both the upper and lower surfaces of the glass sheets. Blowing nozzles 25 are equipped with manifold distributors or slots and are located in close proximity to both the upper and lower surfaces of the glass sheets. In order to preserve the clarity of the illustrations, these manifold distributors or slots have not been included in the Figures although the main conduits are shown.

The holding roller 11 associated with the next to last support roller 4 of the bending and tempering apparatus differs slightly from the proceeding holding roller 11 in that the distance that separates it from its associated support roller 4 is not governed by screw 21, nuts 23 and 22 and spring 24, but, as shown in detail in FIG. 2, by jack 26 fastened to upper frame 2 and acting on arm 19 connected to lower connecting rod 16. Jack 26 operates in response to sensor 27 which detects the presence of a glass sheet placed immediately in front of the next to last support roller 11 identified above.

In zone D, the holding roller 29 associated with the last support roller 4 is mounted in a different manner from prior holding rollers 11. Holding roller 29 is part of a pivoting assembly, generally designated D, which is mounted onto lower frame 1 with an axis of rotation 28 which corresponds to that of the last support roller 4. Pivoting assembly D comprises holding roller 29 mounted within pivoting frame 30, assembly pulley 31 which rotates about axis of rotation 28, cable 33 which is partially wrapped around assembly pulley 31 and attached on one end to pivoting frame 30 at point 32, counterweight pulley 34 over which cable 33 passes, and counterweight 35 to which is attached the other end of cable 33 after it passes over counterweight pulley 34.

Frame 30 is provided with dial 36 which is limited in its rotation by lower stop 37 and upper stop 38. Preferably, stops, 37 and 38 are provided with elastic pins 39 or are mounted on springs to permit dial 36 attached to frame 30 to stop pivoting without jolting.

Dial 36 of pivoting assembly D is provided with a notch 40 into which key 41 can be lodged under the action of spring 42. Key 41 is lifted by the extension of jack 43 thereby acting upon arm 44 attached to key 41.

When sensor 45 detects the presence of a glass sheet near holding roller 29, jack 43 extends, thereby lifting key 41. Gas jet 46 can also be provided to blow air against the upper surface of the glass sheets to begin or accelerate the pivoting of holding roller 29, pivoting frame 30, and dial 36.

Alternatively, the offsetting and pivoting of holding roller 29 about support roller 4 may be achieved by adjustable screws, nuts and appropriate counterweights (not shown).

Following pivoting assembly D in zone D is conveyor E of zone E which is oriented so that it has a slope different from that of the shaping bed formed by support rollers 4. The first support roller 4 of conveyor E consists of the last support roller 4 of the bending and tempering apparatus. The second support roller of conveyor E is attached to supporting frame 1 and is driven by chain drive 47 which also meshes on to the last support roller 4 of pivoting assembly D. The remaining supporting rollers of conveyor E are attached to beams 48 pivotally mounted to support frame 3. Jacks 49 act upon beams 48 to allow beams 48 to tilt, thereby vertically aligning conveyor E with a stationary conveyor (not shown).

If a simple curve of the glass sheets is to be produced, then support rollers 4 are straight, cylindrical rollers, as are the holding rollers 11. If a more complex curve of the glass sheets is to be produced, support rollers 4 are curved, which can be appropriately positioned to obtain a curve in the glass sheet in the crosswise direction. As described in detail in French Pat. Nos. 1,476,785, 2,492,361, 2,129,919, 2,189,330, 2,383,890 and 2,442,219, this curvature is accomplished by rotating the curved support rollers 4 about the axes that pass through their ends. Consequently, holding rollers 11 have complementary shapes. The curved rollers 4 are formed by surrounding a curved rod with a deformable tubular sheath which turns on itself while resting on the rod by means of slide rings composed of graphite, for example. In such case, drive pinions 6 and 13 would be attached to the deformable tubular sheaths rather than the rollers.

Blowing nozzles 25 appropriately hinged to fit the curve of the curved rods used in producing glass sheets with complex curves are described in French Pat. No. 2,144,523.

Advantageously, to permit repair or adjustment of the apparatus, lower frame 1 and upper frame 2 can be separated by means of jacks (not shown).

The apparatus described above operates as follows: Glass sheets are carried by conveyer 9 through heating furnace 10 to the bending and tempering apparatus of the present invention. As described above, the glass sheets may be provided with layers or strips of enamel on the upper surface of the glass sheets. The enamel is baked in furnace 10 and is still fragile upon leaving furnace 10 therefore requiring delicate handling.

Upon leaving furnace 10, the glass sheets are carried by support rollers 4 consisting of straight or curved rollers depending upon whether the glass sheet curvature desired is simple or complex. To the extent that the support rollers 4 are curved, in zone A they are practically flat and through zones B and C the curvature gradually becomes greater as detailed in French Pat. No. 2,442,219.

Support rollers 4 are positioned along a curvilinear profile which extends the line of travel of conveyor 9. The glass sheets, heated to their softening temperature, become curved by resting on the shaping bed formed by rollers 4.

Support rollers 4 and holding rollers 11 are adjusted with screws 21 and nuts 22 and 23 to create a separation equal to the thickness of the glass sheets, increased by the thickness of either a layer of enamel if applied, or any other relief structures which are fragile.

The glass sheets advance through zone A into zone B where they are uniformly curved by assuming the profile of the shaping bed formed by support rollers 4. The glass sheets then enter zone C where the glass is tempered by cooling gas blown onto both the upper and lower surfaces of the glass sheets by nozzles 25. The glass sheets advance through zone C along a path the slope of which gradually increases.

When the glass sheets encounter sensor 27, jack 26 is extended thereby pivoting arm 19 and lower connecting rod 16 and consequently offsetting holding roller 11 in relation to its associated support roller 4.

After an appropriate period of time, jack 26 is retracted thereby applying holding roller 11 against the glass sheets and preventing them from sliding backward.

When the glass sheets encounter sensor 45, jack 43 is extended causing arm 44 to pivot resulting in the disengaging of key 41 from notch 40.

The leading edge of glass sheet V advances beyond pivoting assembly D being supported only by final support roller 4 and final holding roller 29. A rotational force results, optionally reinforced by the air blown against the upper surface of glass sheet V by nozzle 46 thereby causing assembly D to pivot. The restoring force of counterweight 35 combined with the striking of the edges of dial 36 upon elastic pin 39 of stop 37 causes the pivoting of assembly D to be dampened. Jack 43 is retracted and glass sheets V advance over conveyor E.

As soon as the glass sheets are disengaged from pivoting assembly D, the restoring force imparted by counterweight 35 upon pivoting assembly D causes assembly D to return to its original position. Key 41 is then reengaged into notch 40 under the action of spring 42.

The slope of conveyor E is adjusted by jacks 49 so that proper alignment with a stationary removal conveyor results.

During the pivoting of assembly D, the glass sheets are not subjected to rough handling that might damage either the sheets themselves, or any coating layers that have been applied to their surfaces. The pivoting assembly therefore makes it possible for glass sheets exiting a bending and tempering apparatus where the sheets travel on a supporting bed which has a great slope to be transferred to a conveyor that is approximately horizontal without resulting in damage to the glass sheets. A pivoting assembly as described above can also be used in other applications where a sheet of material is to be transferred from a transport system with one slope to another transport system with a radically different slope.

While the invention has been described in conjunction with specific embodiments, it is evident that numerous alternatives, modifications, and variations will be apparent to those skilled in the art in light of the foregoing description.

What is claimed is:

1. In an apparatus for bending or bending and tempering of thermoplastic sheets in which the sheets pass through a shaping bed comprising a plurality of support elements and a plurality of holding means such as rollers or curved rods placed along a curved profile having an upward concavity, means for transfering the sheets from said apparatus to a conveyor having a different slope comprising:

pivoting holding means associated with the last support element of said shaping bed, said pivoting holding means being mounted in a frame which pivots around an axis which coincides with the axis of rotation of said last support element so as to move the holding means from a position in which it is aligned with the curved profile of the shaping bed to one where it is aligned with the slope of the conveyor, and means for applying to said frame a restoring force having a tendency to bring said pivoting holding means mounted in said frame back into such a position that said pivoting means is aligned with the curved profile of the shaping bed.

2. Apparatus according to claim 1 wherein the value of the restoring force is determined so that the pivoting of said pivoting holding means occurs under the effect of the weight of the sheets engaged between said pivoting holding means and said last support element.

3. Apparatus according to claim 2 wherein said pivoting frame is locked in the position for receiving the sheets at the end of the curved profile by a key engaged in a notch of said frame under the effect of a resilient means.

4. Apparatus according to claim 3 further comprising a jack that acts on a bent arm attached to said key under the control of a sensor which detects the presence of a sheet between the next to last holding means and said pivoting holding means and disengages said key upon the arrival and detection of a sheet.

5. Apparatus according to claim 4 further comprising elastic stops that are used to limit and dampen the pivoting movement of said pivoting frame.

6. Apparatus according to claim 5 wherein at least one of said holding means is placed at a desired offset relative to an associated support element by a system of screws and nuts regulating the position of an arm attached to a first connecting rod is attached to said holding means, on a hinge about which it can rotate.

7. Apparatus according to claim 6 wherein a clearance is left between said nuts to permit said arm to move and wherein a resilient means connects the end of said arm to a stop.

8. Apparatus according to claim 4 wherein a holding means is placed with an offset relative to an associated support element by a jack acting on an arm attached to a first connecting rod which carries said holding means about which it can rotate.

9. Apparatus according to claim 8 wherein the offset of said holding means associated with said support element is governed by the jack acting on the arm attached to the first connecting rod which is attached to said holding means.

10. Apparatus according to claim 1 wherein said conveyor for the sheets is mounted on jacks enabling it to pivot and thus adjust its slope to meet a stationary conveyor.

11. Apparatus according to claim 1 wherein said support elements and holding means are straight rollers or straight rollers covered with rings.

12. Apparatus according to claim 1 wherein said support elements and holding means are curved rods.

13. Apparatus according to claim 1 wherein all the holding means, except the next to last and last holding means, are mounted with an adjustable offset in regard to the support elements by a system of screws and nuts regulating the position of an arm connected to a first connecting rod which carries said holding means on a hinge about which it can rotate.

14. Apparatus according to claim 13 wherein said holding means at the beginning of the apparatus are mounted to be able to be offset in the upstream and/or downstream direction of the direction of travel of the glass sheets.

15. Apparatus according to claim 1 wherein the glass sheets have layers or strips of enamel or a relief structure on their upper face.

* * * * *